United States Patent [19]

Thiel et al.

[11] Patent Number: 5,193,652
[45] Date of Patent: Mar. 16, 1993

[54] INWARDLY STRADDLING DISC BRAKE FOR AUTOMOTIVE VEHICLES

[75] Inventors: Rudolf Thiel, Frankfurt am Main; Ulrich Klimt, Gross-Umstadt; Helmut Kast, Frankfurt am Main; Hans Bungert, Geiseheim; Ludwig Dreilich, Kronberg/Ts.; Hinrich Hornbostel, Bad Camberg, all of Fed. Rep. of Germany

[73] Assignee: Alfred Teves GmbH, Frankfurt am Main, Fed. Rep. of Germany

[21] Appl. No.: 613,497

[22] PCT Filed: Feb. 16, 1990

[86] PCT No.: PCT/EP90/00252
§ 371 Date: Oct. 31, 1990
§ 102(e) Date: Oct. 31, 1990

[87] PCT Pub. No.: WO90/10162
PCT Pub. Date: Sep. 7, 1990

[30] Foreign Application Priority Data

Mar. 3, 1989 [DE] Fed. Rep. of Germany ....... 3906713
Feb. 1, 1990 [DE] Fed. Rep. of Germany ....... 4002955

[51] Int. Cl.$^5$ ............................................. F16D 55/00
[52] U.S. Cl. .............................. 188/73.31; 188/73.45
[58] Field of Search ............... 188/73.31, 73.32, 73.33, 188/73.34, 73.1, 71.1, 73.47, 73.36, 73.37, 73.38, 73.35, 73.44, 73.45

[56] References Cited

U.S. PATENT DOCUMENTS

| | | | |
|---|---|---|---|
| 3,424,277 | 1/1969 | Barnes | 188/73.45 X |
| 4,319,670 | 3/1982 | Oka et al. | 188/73.34 |
| 4,577,731 | 3/1986 | Burgdorf et al. | 188/73.45 X |
| 4,921,077 | 5/1990 | Klimt | 188/73.45 |

FOREIGN PATENT DOCUMENTS

| | | | |
|---|---|---|---|
| 1928991 | 12/1970 | Fed. Rep. of Germany | |
| 2310292 | 9/1973 | Fed. Rep. of Germany | |
| 2417612 | 11/1974 | Fed. Rep. of Germany | |
| 2802006 | 7/1979 | Fed. Rep. of Germany | |
| 3906713 | 9/1980 | Fed. Rep. of Germany | 188/73.45 |
| 3515418 | 10/1986 | Fed. Rep. of Germany | 188/73.44 |
| 5663593 | 2/1983 | Japan | |
| 2087013 | 8/1981 | United Kingdom | |

OTHER PUBLICATIONS

Patent Abstracts of Japan, Band 7, Nr 215, M244, Zusammenfassung von 58-109739, publ Jun. 30, 1983 (Akebono Brake Kogyo K.K.).

Primary Examiner—Robert J. Oberleitner
Assistant Examiner—Peter M. Poon
Attorney, Agent, or Firm—John R. Benefiel; Robert P. Seitter

[57] ABSTRACT

A disc brake for automotive vehicles in which the brake disc is straddled radially from the inside by a fist-shaped brake housing. The supporting and guide elements of the housing consist of a supporting bearing (34) and a movable bearing (7). The supporting bearing (34) connects the housing (8) with the holder (6). The housing 8 is swivelable about the supporting bearing (34). The housing (8) takes support on the movable bearing (7) which comprises a pin (3) rigidly coupled directly to the wheel suspension (38). By coupling the movable bearing (7) directly to the wheel suspension and supporting the lining in a tangential direction directly on the entering side, maximum utilization of the radial space, an increase of the effective radius, and a reduction of the thermal load of the brake are achieved.

15 Claims, 7 Drawing Sheets

INWARDLY STRADDLING DISC BRAKE FOR AUTOMOTIVE VEHICLES

BACKGROUND OF THE INVENTION

The present invention relates to a disc brake for automotive vehicles comprised of a movable brake housing straddling the brake disc in a manner like a caliper and having a hydraulic actuating unit for the brake linings, and of a retaining element or for the housing, with the holder being coupled to an element of the wheel suspension.

A disc brake housing includes a brake carrier and a brake housing. In a known spot-type disc brake (as in German patent document DE 38 08 139 A1), one end portion of the spring clip is supported in the brake carrier which is provided with two brake carrier arms interconnected through a connecting web. After the brake lining is inserted, the spring clip is turned over so that it moves into abutment with one section on the brake lining. The other end portion of the spring clip is then slipped beneath the connecting web. For the assembly, the spring clip is therefore required to be pressed down in the direction of the brake lining to the extent that the other free end can be inserted beneath the connecting web. Considerable mounting forces must be generated to achieve this operation. The disc brake discussed herein is of the so-called-"fist"-caliper-type brakes which straddle the respective brake discs from the inside. This type of disc brake which is employed in modern high-power passenger cars offers the advantage of increasing the effective disc radius and of reducing the thermal load.

German patent application No. 3,508,039 discloses an internally straddling disc brake for automotive vehicles. The known device includes a brake disc which is mounted at its outer edge, a stationary brake carrier, a brake housing which is axially slidably supported at the brake carrier by means of a pin guide and is actuatable by means of an actuating device and which straddles the inner edge of the brake disc. Two radially extending webs and a bridge section extending substantially in axial direction and interconnecting the former are provided. A first brake lining which is positioned and supported in the brake carrier on one side of the brake disc and which is directly actuatable by the actuating device and a second brake lining is positioned and supported at the brake housing on the other side of the brake disc and is actuatable by the adjacent web of the housing.

According to the noted German patent application, it is proposed that the pin guide be furnished with a carrying pin being configured in the shape of a fixed bearing which absorbs any major circumferential forces transmitted by the second brake lining through the brake housing to the guide. The pin is rigidly coupled to the brake carrier or the brake housing and engages a guide bore in the brake housing or in the brake carrier, and the carrying pin is positioned in the range of the radial extension of the brake disc.

The present invention has the following objects: A space-saving solution is to be provided for the brake. The assembly space determined by the vehicle manufacturer is utilized to the maximum extent possible. The connecting web positioned radially externally and which is required in the known systems is eliminated. It is, furthermore, an object to increase the effective radius of the brake even more than in the known systems and to reduce the thermal load of the brake to an extent still greater than in the known devices.

On the whole the brake is to become more of a compact-design. The rumbling tendency and generation of other noise are to be reduced. The invention is to provide a greater ease of servicing. The linings are removed and the brake disc is exchanged easily and without disassembling the caliper. The piston-side, that is to say, the internal lining becomes a trailed lining, as a result of which favorable conditions are created for the transmission of the elevated tangential forces occurring in the course of braking. A spot-type brake is provided wherein the internal lining can be mounted more easily and can be retained by a spring.

It is, then, an object of the present invention to achieve an elevated stiffness of the holder and the housing while being of a weight which is lower than that of known brakes. On the other hand, the supporting lug is to be massive and not in the shape of fingers. On account of the material accumulation, a massively designed supporting lug offers the advantage of a reduced noise. The assembly of the brake in the vehicle is to be simplified in accordance with the present invention.

In addition, the holder is to offer ease of tooling relative to known devices. Improvements are provided by the present invention for the casting of the housing. Moreover, expensive and cumbersome milling operations for the fabrication of the lining supports are avoided.

The assembly of the disc is to be simplified. This means that it is achieved that the leaving-side lining support at the holder is eliminated, so that the disc will more easily allow insertion during assembly. Simultaneously, use is made of a thicker lining mass.

SUMMARY OF THE INVENTION

According to the present invention, the foregoing objects are attained in that supporting and guide elements are provided which support and guide the housing at the holder, on one hand, and directly at an element of the wheel suspension, such as the steering knuckle, the pivot bearing, by-passing the holder, on the other hand.

In this context, it is envisaged that supporting and/or guide elements are provided between the housing comprised of the fist caliper and of a piston-and-cylinder unit, on the one hand, and the holder, on the other hand, and between the housing, on one hand, and a direct element of the wheel suspension, on the other hand. It has been found to be of particular advantage that particularly on the entering side of the brake, the housing be coupled to the holder by means of a supporting bearing and preferably in the range of the leaving side of the brake the same is coupled directly to an element of the wheel suspension by means of a movable bearing.

It is, furthermore, envisaged that the housing is swivellably coupled to the holder by the supporting bearing and that the movable bearing is configurated as a supporting member between the housing and an element of the wheel suspension and which prevents the swiveling motions of the housing.

A preferred embodiment of the present invention is provided wherein the wheel suspension is furnished with a guide element, particularly with a pin or with a sleeve at which the housing is guided and/or supported in the shape of a movable bearing.

It is, furthermore, envisaged that the housing is swivellably coupled to the holder by the supporting bearing and that the movable bearing is configured as a supporting member between the housing and an element of the wheel suspension and which prevents the swiveling motions of the housing.

A preferred embodiment of the present invention is provided wherein the wheel suspension is furnished with a guide element, particularly with a pin or with a sleeve at which the housing is guided and/or supported in the shape of a movable bearing. As an alternative, it is envisaged that the wheel suspension is provided with a guide bore within which the housing is guided and/or supported, in particular by a pin-shaped or sleeve-shaped element, in the shape of a movable bearing. For the purpose of vibration dampening, it is envisaged that the movable bearing be furnished with an elastic bushing, in particular with a rubber bushing, which is positioned between the housing and the wheel suspension as a damping element.

A direct discharge of the tangential force impressed during braking on the internal lining is achieved in that the internal lining is furnished with a supporting surface of the peripheral force directly adjacent the supporting bearing and it take support at the holder. The lining back plate of the internal lining which during braking undergoes the effect of tensile forces is arranged with a hammer head having the shape of an "L" which engages a corresponding recess of the holder. A supporting surface is provided at the housing which prevents a swiveling motion of the internal lining radially inwardly and which is preferably positioned in the leaving range of the brake. For the purpose of absorbing the tangential forces which are brought to bearing at the external lining, the external lining is provided with a lining back plate which is furnished with two supporting stops positioned at the side of the supporting lug of the fist. In order to achieve simplified manufacture of the housing, in particular a coreless casting of the housing, the housing is designed as a two-part device, wherein the area of division is positioned parallel to the areas of friction of the brake disc and in the range of the open side of the cylinder of the piston-and-cylinder unit having a cup-shaped configuration.

The following advantages are achieved by the present invention:

Due to the radially external connecting web of the state-of-the-art brake being eliminated, the whole brake unit becomes smaller in its radial extension and the space available is utilized to a maximum extent.

By virtue of the particular division of the housing, no separate component needs to be employed as a cylinder bottom as is necessary in the noted German patent application. The application of a bottom in the shape of a separate component is very expensive. In addition, a highly exact fixation of the bottom is required for reasons of safety. These inconveniences are avoided by the present invention. Advantageously, the supporting lug may, in the present invention, be designed massively and, thus, noise-absorbingly. This is possible owing to the division of the housing. The supporting lug previously was composed of two fingers. The clearance between the fingers was required in the known devices in order to manufacture the piston bore. In addition, the massive supporting lug of the present invention gives the housing a greater stiffness.

The above-noted object to achieve a simple spring retaining arrangement is achieved by a spot-type disc brake of the type initially referred to wherein the two end portions are each rotatably supported in the housing on two adjacent attachment points which are positioned in one joint dead-center plane provided substantially vertically on the brake disc, wherein the spring clips are arranged tiltably substantially in parallel to the brake disc, and wherein the contact between spring clip and brake lining takes place outside of the dead-center plane. The spring clip is supported on two points in the housing which, though adjacent, have a predetermined distance from one another. When the spring clip is swiveled, the end portions of the spring clip move around different points of rotation and are twisted in relation to each other. The spring somewhat compensates for this twisting by moving into a rest position. Two stable rest positions exist, namely, one above the dead-center plane and another below the dead-center plane. When the spring clip is swiveled away from the brake lining, it will assume a stable mounting position when it is swiveled beyond the dead-center plane. In this position, the brake lining can be mounted and dismounted without being hindered by the spring clip. After the brake lining has been fitted or refitted, respectively, it is merely required to swivel the spring clip until above the dead-center plane, if the clip has been swiveled through the dead-center plane, it will compensate again the tension and re-assume a stable position. In doing so, it moves to abut with a predetermined portion on the brake lining and protects the lining from dropping out and prevents it from rattling. Owing to the contact between the spring clip and the brake lining taking place outside of the dead-center plane, it is ensured that tilting of the spring clip beyond the dead-center plane into the mounting position is not allowed to occur as a result of any inadvertent slight movement of the brake lining which can be caused by vibrations, for instance. The mounting of the brake lining is considerably simplified by the spring-retained arrangement in accordance with the present invention. The spring clip need not be dismounted during brake lining replacement, but must only be turned about. Relatively little force is required therefore. Additionally, the spring clip need not be renewed upon replacement of the lining. The spring clip positions itself when swiveled into the retaining position, that is when turned about, so that faulty assembly after brake lining replacement cannot occur. Eventually, the action of detaching the spring clip from the brake lining requires only a short time requirement, which therefore speeds up the assembly.

Advantageously, the dead-center plane and the center line of the brake lining enclose a predetermined angle. In other words, the two attachment points are arranged offset horizontally and vertically to each other when it is taken that the center line of the brake lining is disposed in the horizontal or vertical lines. It is thereby accomplished in a simple fashion that there is always sufficient spring force acting on the brake lining. In a preferred embodiment, the end of the end portions extend substantially vertically to the longitudinal extension of the attachments are necessary therefore, since the spring clip, due to preloading, is sufficiently fastened in the housing bores. To mount the spring clips, the end portions can simply be inserted into the housing bores. It is preferred that the housing bores extend vertically to the brake disc, that housing bores do not require special machining or manufacturing tolerances. They are disposed in the main machining direction which therefore renders the manufacture of the disc brake significantly simpler.

Advantageously, the ends of the end portions are inserted from opposite sides into the housing, with one part of one end gripping over the housing. Of course, the housing many not exceed a specific thickness at this point which otherwise would make the spring too large. For instance, the spring can be arranged in the connecting web between the brake carrier arms. This special arrangement further increases safety with regard to inadvertently losing the spring clip. Namely, the axial movement, that is movement of the spring clip in the direction of the brake disc or away therefrom, is limited owing to arrangement that the two ends are securely held in the housing bores. The part of the end portion gripping over the housing forms a stop for the spring clip lifted from the brake pad and limits the swiveling movement to a predetermined angle. This is accomplished in that the end portion is not only bent two-dimensionally, that is the end portion of the spring clip can be illustrated in one plane. The spring clip is rather bent into the third dimension, too, in the area of the end of the end portion. A clip is obtained which thereby grips over the housing. When the spring clip is swung out away from the brake lining, the part of the end gripping over the housing moves into abutment on the housing and prevents further swiveling movement of the spring clip.

The sum of the lengths of the ends extending into the housing preferably should amount to more than 80% of the thickness of the housing at this point. It will then be required to significantly deform the spring clip in order to remove the ends from the housing. The end of the end portion gripping over the housing can be provided shorter than the other end, and this is because the other end is not retained directly and thus can be dismounted more easily. Expediently, the end portions are offset relative to each other in vertical direction to the brake disc. It is thereby prevented that upon swiveling movement of the spring clip, the end portions lock each other and thus impede the movement of the spring clip. It is furthermore preferred that the end portions are bent in a direction extending substantially vertically to the brake disc in the area of the spring clip peak where the end portions are interconnected. It is ensured thereby that the spring clip will safely retain the brake lining even when the brake lining, even after being worn off considerably, is permanently positioned closer to the brake disc. Advantageously, the fastening pints can be disposed in a boss cast on the housing. This provides somewhat more space to mount the spring clip.

BRIEF DESCRIPTION OF THE DRAWINGS

The present invention will be explained hereinbelow by way of preferred embodiments with reference to the accompanying drawing, wherein.

DETAILED DESCRIPTION

Figure 1:
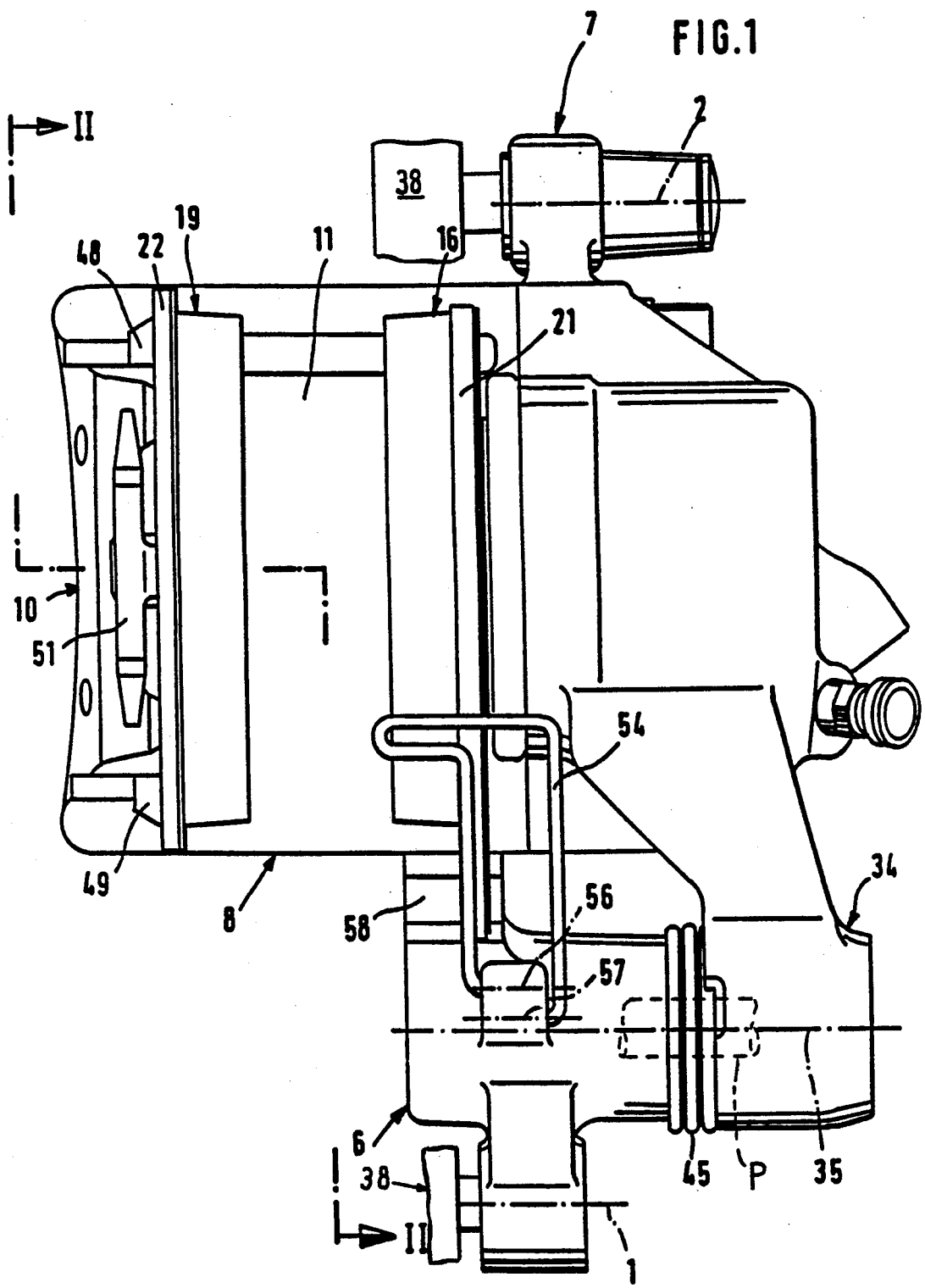
FIG. 1 illustrates a fist-type caliper disc brake according to the invention straddling the brake disc from the inside to the outside in a radial direction, as viewed radially from the outside to the inside.
Figure 2:
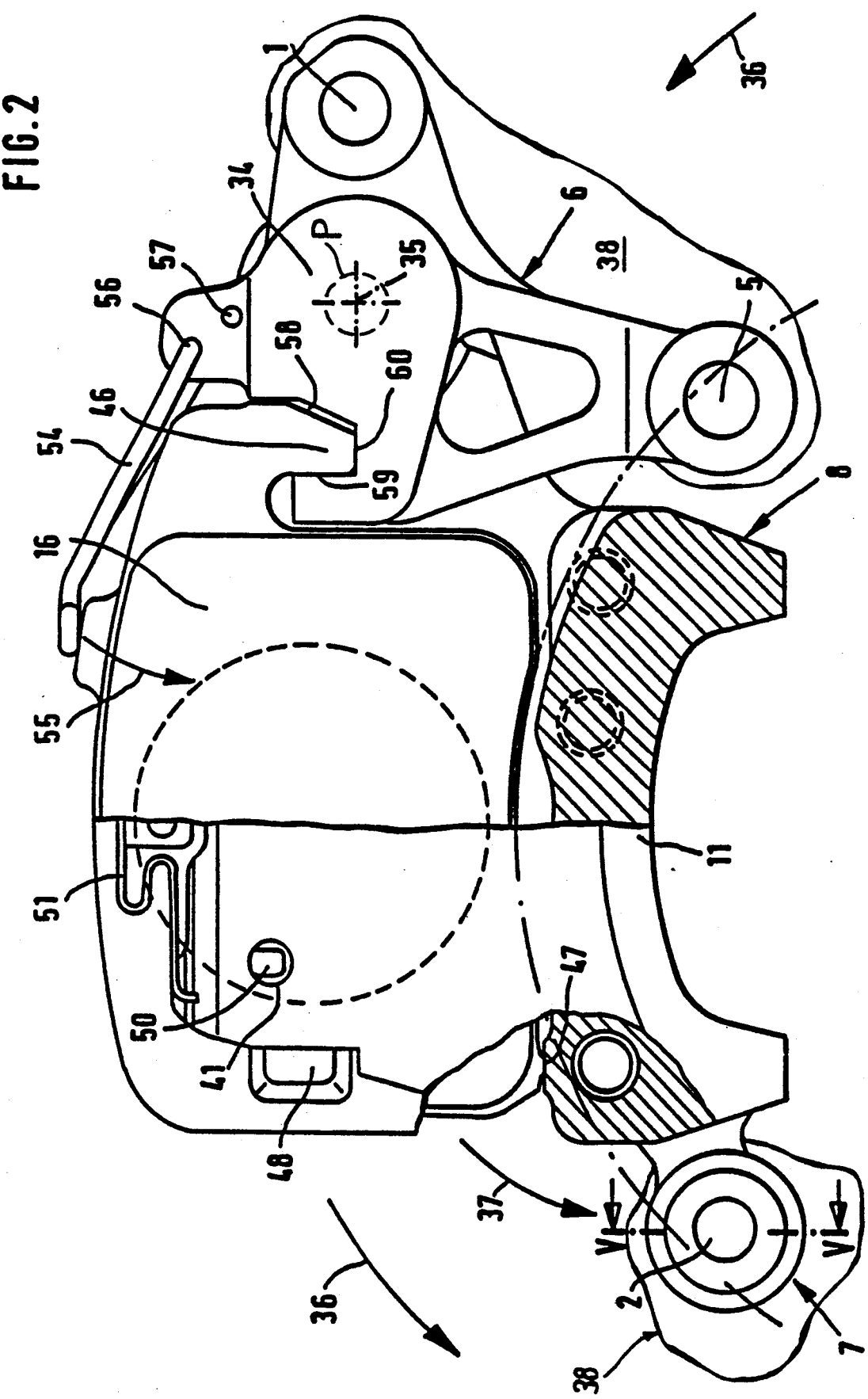
FIG. 2 shows a cross-section view taken along the line II—II of FIG. 1.
Figure 3:
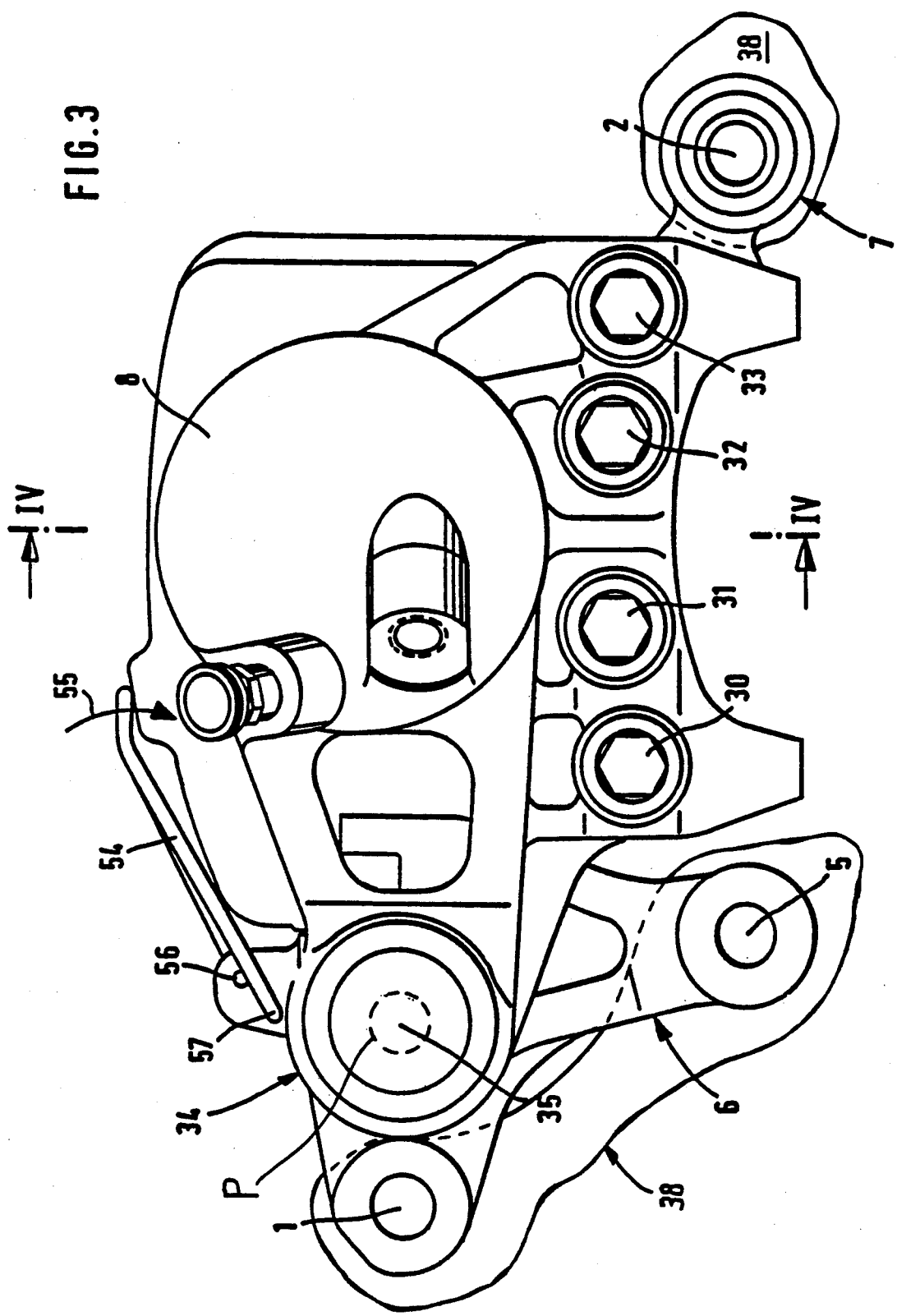
FIG. 3 shows the brake according to FIG. 1 in an axial view from the center of the vehicle toward the outside.
Figure 5:
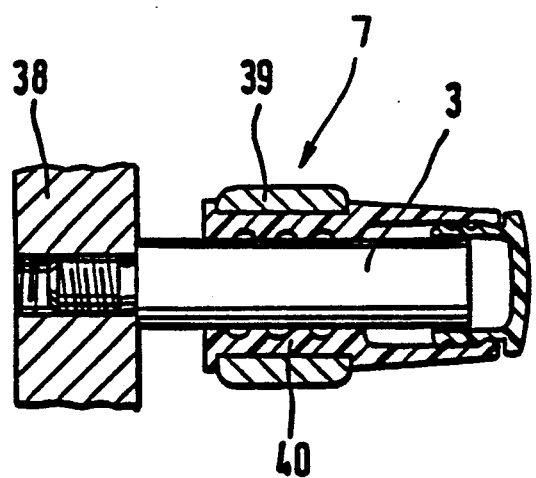
FIGS. 5 and 6 each illustrate one embodiment of the movable bearing in a cross-sectional view taken along the line of FIG. 2.
Figure 6:
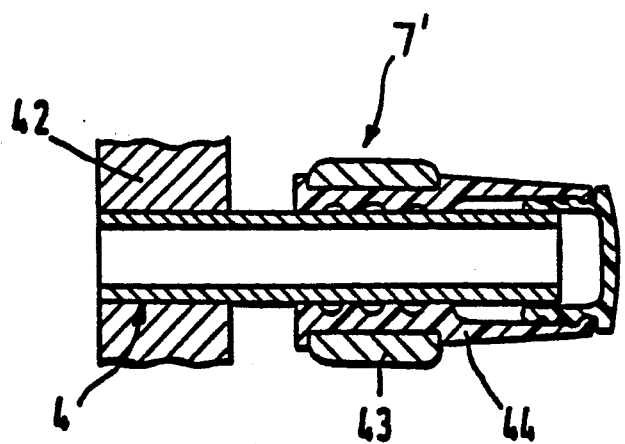

The dash-dotted line 1 in FIG. 1 represents the axis of an element forming part of the wheel suspension. It is illustrated in FIGS. 2 and 3 as point 1. That element of the wheel suspension may, for example, constitute the part of a screw bolt union. The dash-dotted line 2 in FIG. 1, also, represents the axis of an element of the wheel suspension. It is illustrated in FIGS. 2 and 3 as point 2. As illustrated in FIGS. 5 and 6, this element of the wheel suspension may be provided in the shape of a pin 3 or in the shape of a sleeve 4 forming a part of a movable bearing. In FIGS. 2 and 3, an axis which is disposed at right angles to the drawing plane is illustrated by a point 5. This is the axis of an element forming part of the wheel suspension, for example, of a screw bolt union.

The elements arranged in the items 1 and 5, for example, screw bolt unions, serve to fix the brake holder 6 to parts of the wheel suspension which are not shown in the drawing. These parts, for example, may be elements of the steering knuckle or the elements of a pivot bearing. The dash-dotted line 2 in FIGS. 1 and 4, and the more detailed illustration in FIGS. 2 and 3 represents the axis of the movable bearing 7. As discussed above, the three-dimensional configuration of the movable bearing is illustrated in FIGS. 5 and 6 which will be described in more detail below.

Figure 4:
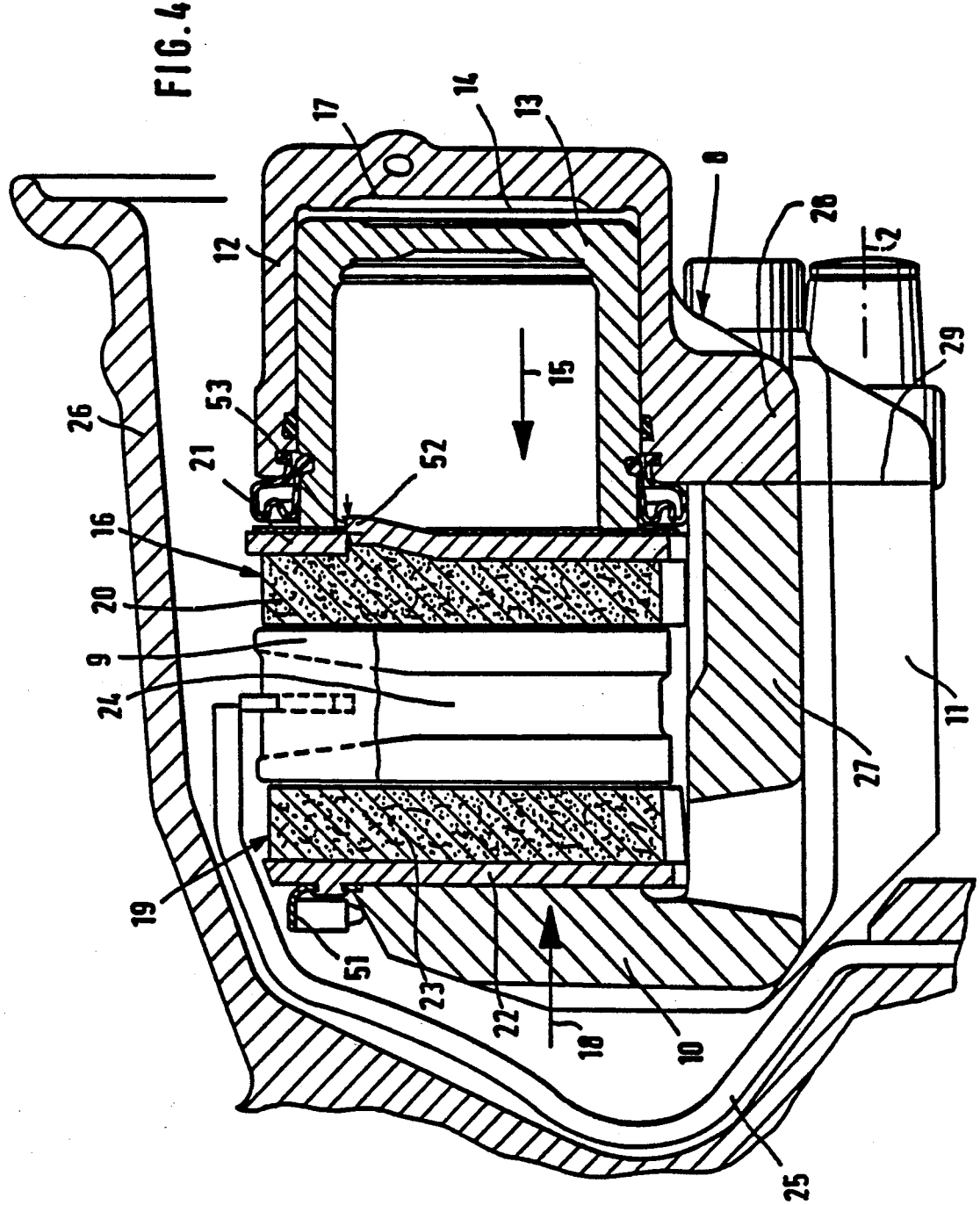
FIG. 4 shows a cross-sectional view taken along line IV—IV of FIG. 3.

Brake housing 8 is fist-shape, as is more clearly illustrated in FIG. 4. The fist is open outwardly in radial direction and straddles the brake disc 9. Reference numeral 11 denotes the internal bridge of the housing. The cylinder of the housing is identified by reference numeral 12. In the cylinder the hydraulically actuatable piston 13 is provided. When the pressure chamber 14 is pressurized by the hydraulic fluid, the piston 13 moves to the left, in the direction of the arrow 15 and slides the brake lining 16 against the brake disc 9.

The hydraulic power which is brought to bear on the bottom 17 of the cylinder slides the cylinder 12, the bridge 11 being rigidly coupled to the cylinder 12, and the supporting lug 10 to the right, that is, inwardly, in the direction of the center of the vehicle as indicated at arrow 18. As a result, the lining 19 is moved to the right and urged against the brake disc. Accordingly, the lining 16 is urged against the brake disc 9 directly by the action of the piston 13, whereas by the force of reaction, through sliding of the housing 8 to the right as described above, the external lining 19 positioned on the left is slid to the right and is urged against the rotating disc 9, whereby the braking takes place. The internal lining 16 positioned on the right comprises lining material 20 and the back plate 21. The external lining positioned on the left comprises the back plate 22 and the lining material 23.

The brake disc 9 is arranged as a ventilated brake disc. The brake disc 9 is provided with a cast body which is furnished with ducts, one of which being illustrated in FIG. 4 and identified by reference numeral 24. During rotation of the disc a flow of air is generated radially outwardly through the ducts, which flow provides heat discharge. The brake disc 9 normally made of cast iron is coupled to a steel body 25. The steel body is fixed to the wheel in the known manner. The wheel is outlined diagrammatically by the base 26 of the rim.

The housing 8 is provided of a two-part construction, a combined bridge and supporting lug section 27 and a cylinder section 28. Reference numeral 29 denotes the area of division of the two parts of the housing. The two housing halves 27, 28 are coupled to each other by the screw bolts 30, 31, 32, 33.

As described above, the holder 6 is rigidly coupled to the wheel suspension 38, such as, for example, to the steering knuckle or to the pivot bearing, by the screw bolts in items 1 and 5. The housing 8 is swivellably coupled to the holder 6 by a supporting bearing 34. The axis of the supporting bearing 34 is identified by reference numeral 35. The supporting bearing may be formed by a pin P which is fixed in the housing 8 by means of a force fit and which is allowed to axially slidingly move in the holder 6 (that is, in a sliding fit). As an alternative, the arrangement may be realized by a force fit of the pin P in the holder 6 and by a sliding fit in the housing 8.

The tendency of swiveling of the housing 8 with respect to the holder 6 occurs when the brake linings 16, 19 are urged against the brake disc 9 and a force in tangential direction comes above. The position of the imaginary central point of attachment of the tangential forces at the linings and the position of the axis of the supporting bearing are selected such that the housing 8 has a tendency of swiveling in counterclockwise sense, in the direction illustrated by the arrow 37. The sense of rotation of the brake disc 9 is indicated by the arrows 36 in FIG. 2. Accordingly, the force in the tangential direction in FIG. 2 acts toward the left. In this situation, the housing 8 therefore tends to rotate in the direction of the arrow 37 illustrated in FIG. 2. That rotation is prevented by the movable bearing 7. Two embodiments of the movable bearing are illustrated in FIGS. 5 and 6.

According to FIG. 5, the pin 3 is screwed into the wheel suspension 38. A housing eye 39 is provided at the housing 8. The pin 3 and the housing eye 39 form the movable bearing. An elastic bushing 40 is positioned between the housing eye 39 and the pin 3. The eye 39 is axially slidingly positioned on the pin 3. FIG. 6 shows an alternative of FIG. 5. According to FIG. 6, a sleeve 4 is rigidly coupled to an element 42 of the wheel suspension. The elastic bushing 44 is disposed between the eye 43 of the housing and the sleeve 4. The eye 43 is axially slidingly positioned on the sleeve 4.

Analogously, an axial slide arrangement of the housing 8 on the supporting bearing 34 is possible. A bellows 45 (FIG. 1) is provided for sealing of the supporting bearing 34 in the event of the axial movement of the housing on the holder. The housing 8 is, thus, arranged slidingly on parts of the holder 6 and directly on parts of the wheel suspension.

An easy-motion, maintenance-free guide system which is provided and comprised of a supporting bearing 34 positioned at the entering side of the brake and of a movable bearing 7 positioned at the leaving side of the brake. A rotary motion of the housing 8 about the axis of the supporting bearing 34 is prevented by the movable bearing 7 as described above. The movable bearing 7 also balances manufacturing tolerances. The braking force of the internal lining 16 is absorbed directly by the holder 6. The braking force of the external lining 19 is conveyed through the housing 8 to the entering-side supporting bearing 34.

It is apparent from the Figures that a connecting web which was required in prior devices is eliminated in accordance with the teachings of the present invention. As a result, the brake as a whole, in particular in the radial direction, becomes smaller, more compact and more light-weight. In addition, the inventive brake system offers favorable feature for an easy and quick assembly in the vehicle.

Guidance and support of the piston-side, that is, of the internal lining 16 is by means of an L-shaped hammer head 46. Advantageously, the internal lining 16 is a trailed lining, that is, the elevated forces occurring in the event of braking are transmitted by the hammer head directly to the holder 6 in the entering range of the disc brake immediately beside the carrying pin. Radial support is given to the internal lining 16 by a stop 47 provided on the leaving side of the brake, on the housing bridge 11.

Support is provided to the external lining 19 by two supporting noses 48, 49 positioned on the back plate 22 of the lining 19 and abutted aside the supporting lug 10 of the first housing part and, as a result, supporting the external lining 19 in either direction of rotation. Projections are provided for the radial fixation of the external lining, one of which is identified by the reference numeral 50 in FIG. 2. These projections engage recesses 41 of the supporting lug 10. Furthermore, a pad retaining apparatus 51 with a spring urges the external lining 19 inwardly in a radial direction and which secures the lining in this manner.

The back plate 21 of the internal lining 16 is furnished with a nose 52 which is bent outwardly into the cup space of cup-shaped piston 13 (FIG. 4). Reference numeral 53 denotes the measure of the front surface of the nose 52 which projects into the cup space and which is larger than the clearance of the brake. In this manner the nose 52 serves as a safety means against loss of the internal lining in the event of rupture of the spring 54. Spring 54 serves as a retaining and holding-down member for the internal lining 16. As is illustrated in FIG. 2, the spring 54 presses on the lining in the direction of the arrow 55 and, thus, retains it on its surface of support free of rattling noise. The positions of the swivel axes 56, 57 of the retaining spring and its configuration are selected such that a prestress is created in the direction of arrow 55.

The following is a description of the transmission from the internal lining 16 and from the external lining 19 to the wheel suspension of the elevated tangential force which comes about during a braking action. When the brake is operated, the internal lining 16 is pressed against the brake disc rotating in the direction of the arrows 36, and is trailing as illustrated. Tangential support is given through the L-shaped hammer head 46 in a corresponding hook recess 58 in the holder 6, besides the supporting bearing 34 and the carrying pin. The supporting surface for the tangential forces in the hook recess 58 bears reference numeral 59. Radial support is given to the lining 16 through the supporting surface 60. The force is transmitted from the holder 6 to the wheel suspension.

Tangential support of the external lining 19 is provided by means of two supporting noses 48, 49 which project from the back plate 22 and are positioned besides the supporting lug 10 at the fist. In this manner, the force in tangential direction which is impressed on the external lining 19 is transmitted to the housing 8. From the housing 8, the force is conveyed onward to the supporting bearing and from there to the holder. The holder 6 is rigidly coupled to the wheel suspension. The force is transmitted onward from the holder 6 to the wheel suspension.

Figure 7:
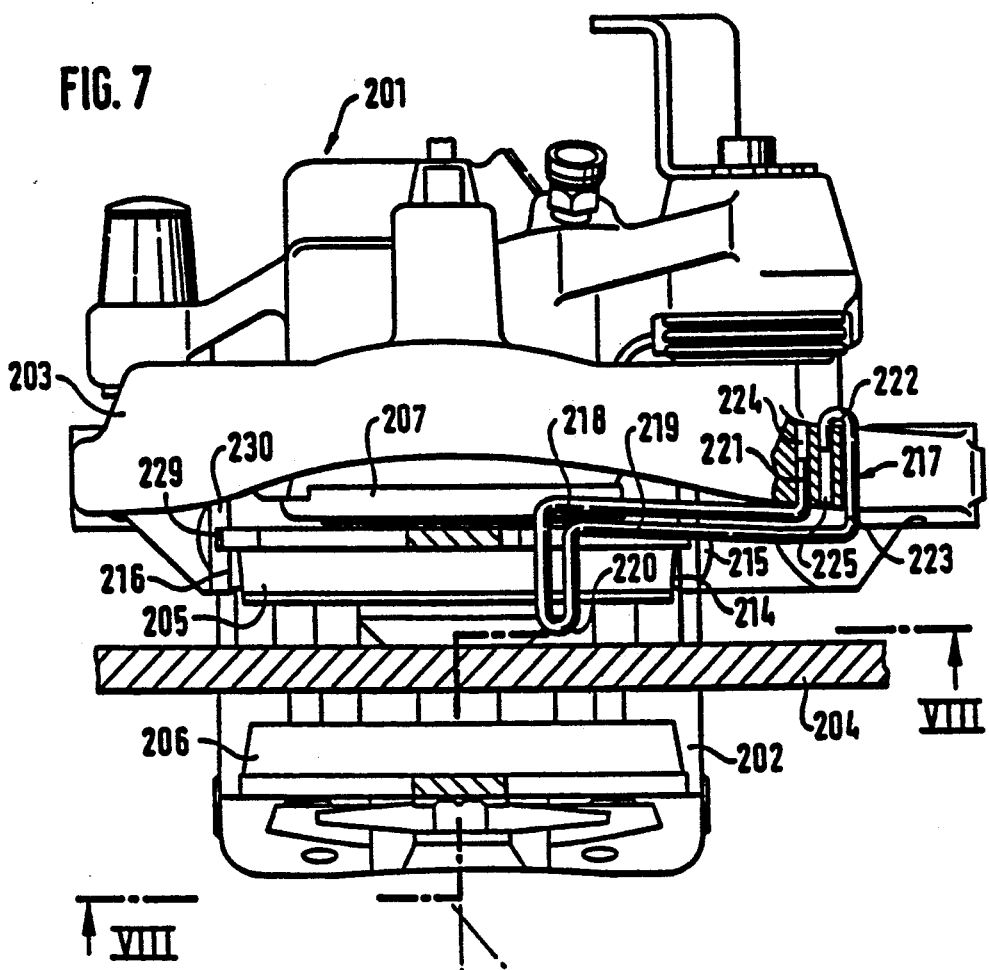
FIG. 7 shows another disc brake incorporating different embodiment of the spring clips according to the present invention.
Figure 8:
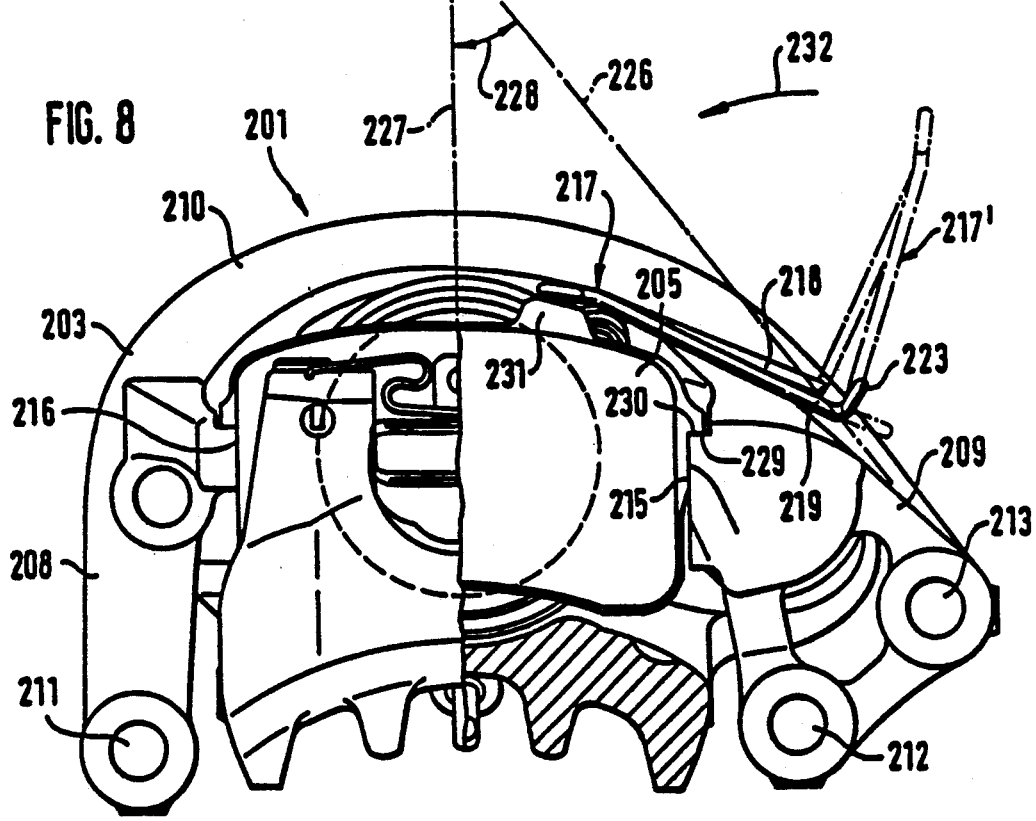
FIG. 8 shows a cross-section view taken along the line VIII—VIII of FIG. 7.

In FIGS. 7, 8 a disc brake 201 comprises a housing comprising a brake housing 202 and a brake carrier 203. The disc brake 201 further comprises a brake disc 204 whereagainst brake linings 205, 206 can be moved by means of an actuating device 207. The direction of motion of the brake linings 205, 206 in the direction of the brake disc 204 will be referred to as axial direction in the following. The brake carrier 203 is furnished with two brake carrier arms 208, 209 which are interconnected by way of a connecting web 210 so that the brake carrier 203 is of arcuate configuration. By way of three bores 211, 212, 213, the brake carrier 203 can be connected with a steering knuckle (not shown) of a vehicle. The brake lining 205 is received in an aperture 214 which is confined by supporting surfaces 215, 216 in circumferential direction. To retain the brake lining 205 against displacing in a direction in parallel to the brake disc, which hereinbelow will be referred to as radial direction, the brake lining 205 comprises shoulders or steps 229 resting on corresponding supporting surfaces 230 of the brake carrier.

The movement of the brake lining 205 in radial direction away from the supporting surface 230 is bounded by a spring clip 217 having two end portions 218, 219 interconnected at a peak 220. While the end portions 218, 219 of the spring clip extend substantially in parallel to the brake disc 204, the peak 220 of the spring clip 217 to which the end portions 218, 219 are interconnected, is bent off in axial direction. The peak bears against a projection 231 of the brake lining 205. This peak 220 of the spring clip 217 extends over a predetermined length so that, even in the event of the brake lining 205 moving in an axial direction due to lining wear, it is always ensured that the spring clip 217 overlaps the brake lining 205.

The end portions 218, 219 comprise clip ends 221, 222. Clip end 221 of end portion 218 is simply bent off in axial direction. Clip end 222 of end portions 219 of spring clip 217 is first bent upwards in a plane parallel to the brake disc 204, while subsequent thereto it is bent in axial direction to form a portion 223 overlapping the connecting web 210, and finally it is bent by 180° so that also the end of clip end 222 extends in axial direction. That is, the two end surfaces of the spring clip are practically opposed to one another. To attach the spring clip 217, the connecting web contains two bores 224, 225 into which the two clip ends 221, 222, are inserted from opposite sides. The clip ends 221, 222 are sufficiently long that the sum of their lengths disposed within the bores 224, 225 is more than 80% of the housing thickness, that is the thickness of the connecting web 210 at this location. It is thereby ensured that the spring clip 217 will not be removed from the housing inadvertently. The clip end 222 is shorter than the clip end 221. This is possible because the end portion 219 overlaps the connecting web 210 and is thus safely retained already.

The two bores 224, 225 are positioned in axial direction. They are offset in horizontal and vertical directions in respect of a center axis 227 of the brake lining 205. The two bores 224, 225 are disposed in a dead-center plane 226 forming an angle 228 with the center axis 227. When the spring clip 217 is swivelled in the direction of the arrow 232, the two end portions 218, 219 of the spring clip 217 move about different points of rotation and are twisted in relation to each other. This torsion reaches a maximum when the spring clip 217 is in the dead-center plane 226. There is a balance achieved in this dead-center plane 226. In the event of a slight movement in the direction of the arrow 232 beyond the dead-center plane 226, the spring clip 217 again relieves from its stress. In doing so, it moves by the action of its own preload in the direction of the brake lining 205 and finally comes to abut on the projection 231 of the brake lining 205.

To dismount the brake lining 205, it is merely necessary to tilt the spring clip 217 opposite to the direction of the arrow 232 beyond the dead-center plane 226. As soon as the spring clip 217 has been swivelled beyond the dead-center plane 226, it will assume a position 217' due its own stress which is represented by a dash-dotted line. Further movement of the spring clip 217 is prevented by the overlapping portion 223 which abuts on the connecting web 210 in the position 217'. After replacement of the brake lining 205, the spring clip 217 must again be swivelled in the direction of the arrow 232. After the dead-center plane is traversed, the spring clip automatically abuts on the brake lining 205. The inherent tension of the spring clip 217 will then generate the required retaining force for the brake lining 205. That is, the spring need not be dismounted any more on replacement of the brake lining 205, instead it must only be tilted over.

The portion gripping over the connecting web 210 prevents the spring clip 217 from tilting over too far. Spring clip 217 positions itself when swung inwards, that is when tilted in the direction of the brake lining, so that neither faulty assembly after lining replacement nor loss of the spring clip 217 also causes the clip ends 221, 222 to clamp in the bores 224, 225, thereby providing reliable attachment of the spring clip in bores 224, 225.

The end portions 218, 219 of spring clip 217 are offset relative to each other in axial direction. It is ensured thereby that they will not obstruct each other when the spring clip 217 is swivelled in the direction of the arrow 232. Instead, they can pass by each other.

Figure 9:
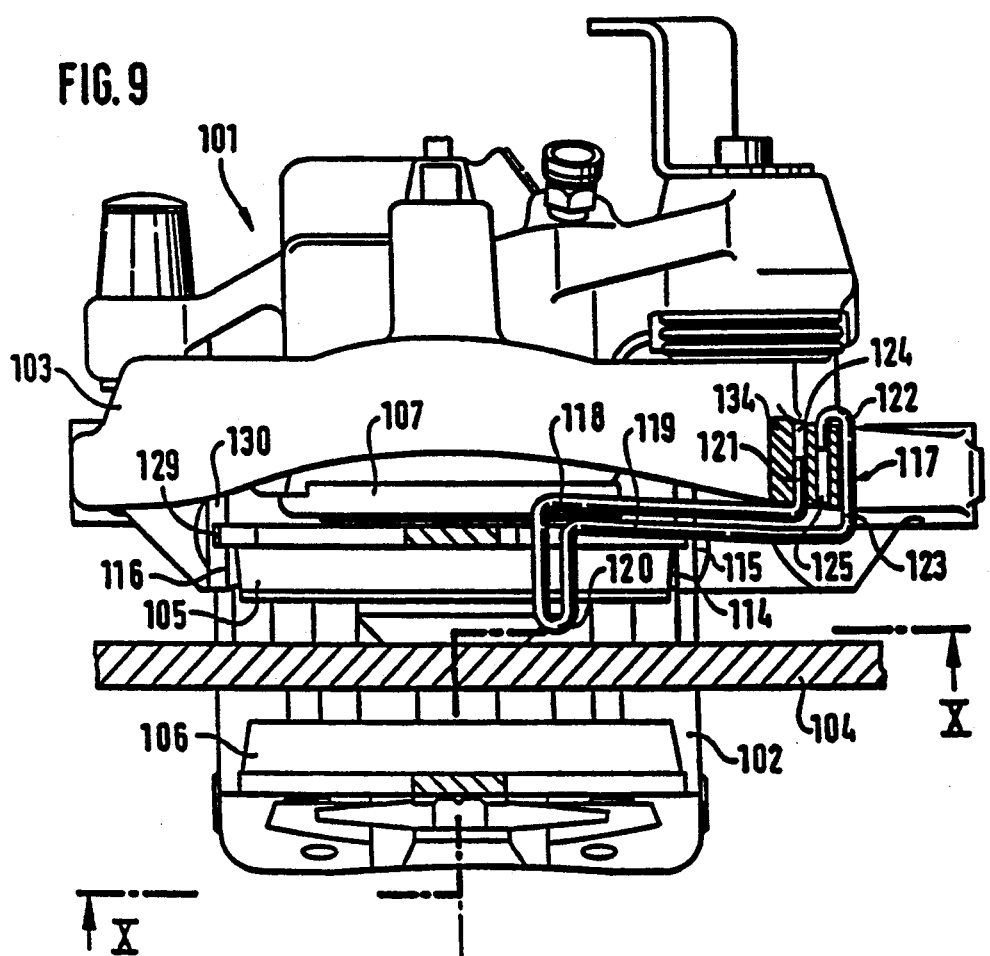
FIG. 9 shows another form of a disc brake incorporating another embodiment of the spring clips according to the present invention; and, FIG. 10 shows a cross-section view taken along the line X—X of FIG. 9.
Figure 10:
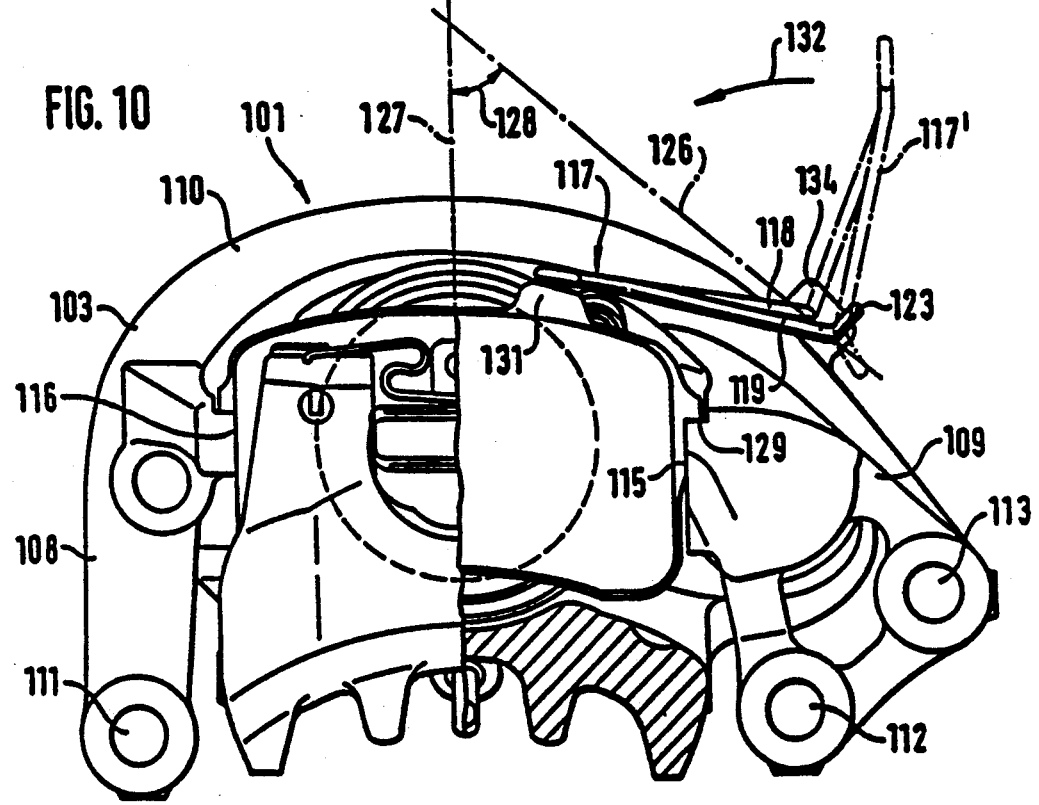

FIGS. 9 and 10 show another embodiment of the disc brake wherein component parts corresponding to those of FIGS. 7 and 8 have been assigned reference numerals lowered by 100. In contrast to the embodiment of FIG. 7, the spring clip 117 is not fastened directly in the connecting web 110, but instead is provided in a cast boss 134 arranged in radial direction outside on the connecting web 110. This provides greater design freedom in providing for the attachment of the spring clip.

What is claimed is:

1. A disc brake mounting arrangement for an automotive vehicle rotary wheel, said automotive vehicle having rotationally fixed wheel suspension structure,
    said disc brake including an annular brake disc and a member mounting said annular brake disc to said wheel, said mounting arrangement comprising:
    a brake housing including a cylinder section on one side of said brake disc and a bridge section extending within said brake disc including a lug support extending radially outward to lie opposite said other side of said brake disc, said brake housing thereby straddling said brake disc with said brake disc rotating from an entering side to a leaving side of said brake housing;

a cylinder bore formed in said cylinder section extending in an axial direction at said one side of said brake disc;

an actuator piston slidably disposed in said bore and having one end facing said brake disc one side;

an internal brake lining disposed between said piston one end and said brake disc to be able to be forced into engagement with said one side of said brake disc by said piston and means including a backing plate supporting said internal lining to resist tangential forces exerted by engagement of said lining with said brake disc;

an external brake lining disposed between said lug support and the other side of said brake disc to be able to be forced into engagement with the other side of said brake disc by axial shifting of said lug support and means including a backing plate supporting said external lining to resist circumferential forces exerted thereon upon engagement with said brake disc;

a holder and means for attaching said holder to said rotationally fixed wheel suspension structure, said holder disposed only on one side of said brake housing;

means rotationally mounting said brake housing to said holder at a single point on one side of said housing, said means allowing limited axial movement of said brake housing; and means mounting said brake housing to said rotationally fixed wheel suspension structure at another point of said brake housing on the other side of said brake housing from said single point mount to said holder, said means allowing limited axial movement of said brake housing.

2. A disc brake mounting arrangement according to claim 1, wherein said means supporting said internal brake lining comprises a hammer shaped end portion on one end of said internal brake lining back plate and a hook recess on a portion of said holder, said hammer shaped end portion extending radially inwardly into said hook recess with adjacent radial surfaces on either side of said hammer shaped portion engaging radial surfaces on either side of said hook recess to enable resistance to tangential forces.

3. A disc brake mounting arrangement according to claim 2, wherein said means supporting said external brake lining comprises circumferentially spaced portions of said lug support extending on either side of adjacent portions on said external brake lining back plate.

4. A disc brake mounting arrangement according to claim 3, further including projections on said lug support extending axially to protrude into openings on said external lining backing plate.

5. A disc brake mounting arrangement according to claim 2, wherein said hook recess of said holder and hammer shaped end portion of said internal brake lining back plate are on the brake disc entering side of said housing, whereby said internal brake lining is pulled by engagement with said brake disc.

6. A disc brake mounting arrangement according to claim 2, further including a stop surface on the leaving side of said housing engaging the lower other end of said internal brake lining back plate.

7. A disc brake mounting arrangement according to claim 1, further including a spring retainer mounted on said holder to exert a radially inwardly directed spring force on said internal brake lining backing plate.

8. A disc brake mounting arrangement according to claim 7, wherein said spring retainer comprises a spring element having a pair of parallel elongated portions each having an axially bent end received in a respective one of a pair of radially and circumferentially spaced axially extending mounting holes in said holder, said elongated portions connected together at their other end, said connected ends overlying said internal brake lining back plate when swung down, a line through the center of said mounting holes forming an acute angle with a vertical line extending through the center of said internal brake lining.

9. A disc brake mounting arrangement according to claim 1, wherein said single point of support of said housing on said holder is on the brake disc entering side of said housing.

10. A disc brake mounting arrangement according to claim 1, wherein said housing sections are bolted together along a lower flange portion of said cylinder section having a radial face abutting against a radial face on an end of said bridge section, and wherein said support lug is a solid piece integral with said bridge section.

11. In a disc brake including a brake disc mounted to a rotatable wheel, a brake housing having portions thereof straddling said brake disc, an internal brake lining disposed on one side of said brake disc and adjacent one portion of said brake housing and an external brake lining disposed on the other side of said brake disc and adjacent another portion of said brake housing, each of said internal and external brake linings including a back plate, said brake disc of annular shape with said brake housing portions connected with a bridge passing under said annular brake disc, a holder and means mounting said brake housing to said holder allowing limited axial movement of said brake housing, a spring clip mounted to said holder and acting on said internal brake lining back plate, said spring clip including a pair of elongated leg portions extending radially from said holder, one end of each of said leg bent to extend axially and received in axial holes spaced apart radially and tangentially, the other end of each leg portion connected together, said connected ends located to engage the outside of said internal brake lining back plate upon swinging of said leg portions down and towards said back plate at an off center point on said back plate, a line connecting said axial holes extending at an acute angle to a vertical line passing through the center of said back plate whereby said spring clip exerts a spring force on said back plate after being swung over through a vertical plane to come into engagement therewith, and assumes another stable position when swung back through said vertical plane.

12. A disc brake according to claim 11, wherein said connecting ends of said leg portions are bent to extend axially to accommodate wear of said internal brake lining.

13. A disc brake according to claim 11, wherein said one end extended axially in opposite directions into said holder.

14. A disc brake according to claim 11 wherein one of said leg portions end is bent in one radially out segment, an axially back segment, a radially in segment, and an axially out segment to enter said hole in an axial direction opposite from that of the other leg end.

15. A disc brake according to claim 14 wherein said axially out segment engages said holder surface upon said spring clip assuming said another stable portion to act as a stop.

* * * * *